April 17, 1956 F. O. HARRIS 2,741,968
AERATOR BAR FOR LAWN ROLLERS
Filed April 13, 1953
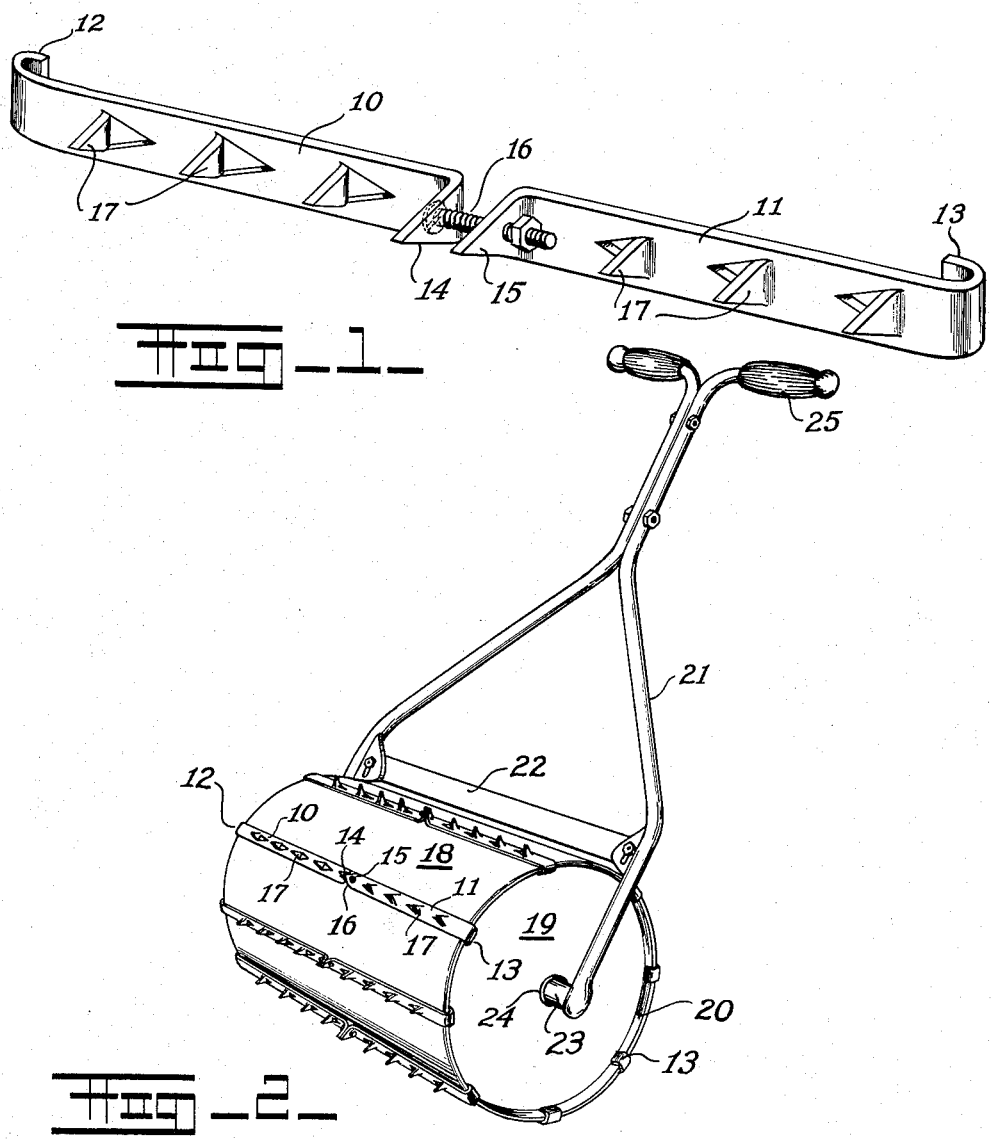
INVENTOR.
Frank O. Harris
BY
*W. B. Harpman*
ATTORNEY United States Patent Office 2,741,968
Patented Apr. 17, 1956

2,741,968
AERATOR BAR FOR LAWN ROLLERS
Frank O. Harris, Lowellville, Ohio

Application April 13, 1953, Serial No. 348,311

4 Claims. (Cl. 97—52)

This invention relates generally to lawn rollers and more particularly to an aerator bar for detachable mounting on a lawn roller.

The principal object of the invention is the provision of an aerator bar for attachment to a lawn roller.

A further object of the invention is the provision of a simple and inexpensive device for converting a lawn roller into a lawn aerating tool.

A still further object of the invention is the provision of a lawn aerating bar formed of a pair of oppositely disposed duplicate stamped metal parts.

A still further object of the invention is the provision of a lawn aerator bar for attachment to a lawn roller and comprising a pair of metal strips having spikelike sections punched therefrom with adjacent ends of the strips bent upwardly and apertured to provide for positioning a nut and bolt therethrough.

A still further object of the invention is the provision of a simple and inexpensive aerator bar, a plurality of which may be clamped onto a lawn roller to convert the lawn roller into a lawn aerator tool.

The aerator bar disclosed herein comprises an efficient lawn aerating device adapted to punch suitable holes into a lawn for the joint purpose of aerating the soil and facilitating the entrance of water thereinto.

It is well known that lawns formed on clay soils require aerating from time to time which in itself comprises punching holes in the turf and which has heretofore been done by special aerating tools usually incorporating a plurality of spikes and means for moving them vertically in a tamper-like motion against the turf. Lawns formed on other soils are more effectively fertilized, seeded and watered when aerated.

Such devices heretofore known in the art have been relatively difficult to operate and required considerable manual effort and have therefore not been widely used. On the contrary, the present invention can be inexpensively formed, readily attached to a lawn roller and the turf aerated by simply moving the aerator thereacross.

In the preferred form of the invention a plurality of identical aerator bars are clamped to a lawn roller by hooking the end of the bars over the end flange of the roller and shortening the over-all length of the aerator bars by tightening the nut and bolt assemblies joining the two sections of aerator bars to one another.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is an enlarged perspective view of a lawn aerator bar.

Figure 2 is a perspective view on a smaller scale showing a lawn roller with a plurality of lawn aerator bars in position thereon.

By referring to the drawings and Figure 1 in particular it will be seen that an aerator bar has been disclosed comprising a pair of identical body portions 10 and 11, each of which is formed of a section of strip steel of suitable width and thickness, the ends 12 and 13 of which are inturned so that they may be hooked over the flanges on a lawn roller and the other ends 14 and 15 out-turned, pointed and apertured for the reception of a bolt and nut assembly 16.

Intermediate the ends 12 and 14 and 13 and 15 there are a plurality of cut and formed spikes 17—17. Each of the spikes 17 is preferably pointed as by blanking the same from a triangular section of the bars 10 and 11 and bending the section outwardly without severing it from the remainder of the bar. It will thus be seen that the ends 14 and 15 and the spikes 17 form effective means for puncturing the turf as necessary in aerating a lawn and particularly when an assembly of the bars 10 and 11 is positioned on a lawn roller as shown in Figure 2 of the drawings.

By referring to Figure 2 of the drawings it will be seen that a roller is disclosed having a cylindrical body member 18 with end portions 19 set inwardly of the cylindrical roller 18, as conventional in the art, and thereby forming projecting flanges 20 over which the inturned ends 12 and 13 of the aerator bars may be positioned.

A handle 21, which is bifurcated as customary in the art, carries a movable scraper bar 22 which is shown in elevated relation with respect to the surface of the roller and lower ends of the handle are offset as at 23 and rotatably engage openings 24 formed in the end portions 19. The opposite or upper ends of the bifurcated handle 21 are outturned and provided with molded rubber grips 25, as customary in the art.

Still referring to Figure 2 of the drawings it will be observed that a plurality of the aerator bars have been clamped to the cylindrical roller 18 by engaging their inturned ends 12 and 13 over the flanges 20 formed by the projecting ends of the cylindrical roller 18 with respect to the end plates 19. The aerator bars are secured to the roller by tightening the nut and bolt assembly 16 which shortens the effective length of the bars and thereby effectively clamps the same on the cylindrical roller 18.

It will thus be seen that when the roller is moved across a lawn, the spikes 17 and the outturned pointed ends 14 and 15 of the aerator bar puncture the turf and aerate the soil.

It will further be seen that when an aerating operation is completed, the bolt and nut assembly may be loosened, the bars 10 and 11 removed from the roller and the roller used in the customary manner.

It will thus be seen that the several objects of the invention have been met by the foregoing disclosure.

Having thus described my invention, what I claim is:

1. An aerator bar for a lawn roller comprising a pair of oppositely disposed elongated body members, the outer ends of which are inturned and the inner adjacent ends of which are outturned, pointed and apertured, a nut and bolt assembly positioned through said apertured outturned ends for moving said body members toward one another, each of said body members having a plurality of pointed sections thereof partially severed therefrom and outturned to form ground engaging spikes.

2. The combination of a lawn roller and a plurality of aerator bars for detachable engagement thereon, said lawn roller having flanges on its opposite ends and the aerator bars having inturned outer end portions registrable over said flanges and outturned pointed inner ends, each of said aerator bars comprising a two-part assembly with interconnecting means for moving the two parts toward one another and each of the said aerator bars having a plurality of outturned spike-like projections.

3. An aerator bar for a lawn roller comprising a pair of oppositely disposed elongated body members, the outer ends of which are inturned and lie in spaced relation to the body members themselves and on planes parallel therewith, the inner adjacent ends of said body members being outturned and apertured, a nut and bolt assembly positioned through said apertured outturned ends for moving said body members toward one another, each of said body members having a plurality of pointed sections thereof partially severed therefrom and outturned to form ground engaging spikes.

4. The combination of a lawn roller and a plurality of aerator bars for detachable engagement thereon, said lawn roller having flanges on its opposite ends and the aerator bars having inturned outer end portions registrable over said flanges and outturned inner ends, each of said aerator bars comprising a two-part assembly with interconnecting means for moving the two parts toward one another, each of the outturned inner ends being apertured and said means for moving the two parts toward one another comprising nut and bolt assemblies positioned therethrough, each of said aerator bars having a plurality of spikelike projections formed from partially severed portions thereof, said partially severed portions being outturned with respect to said aerator bars.

References Cited in the file of this patent

UNITED STATES PATENTS

| | | |
|---|---|---|
| 72,438 | Worley | Dec. 17, 1867 |
| 1,483,789 | Earhart | Feb. 12, 1924 |
| 2,410,465 | Small | Nov. 5, 1946 |
| 2,476,084 | Cour | July 12, 1949 |
| 2,612,202 | Bumbaugh | Sept. 30, 1952 |

FOREIGN PATENTS

| | | |
|---|---|---|
| 121,154 | Great Britain | of 1918 |